No. 894,317. PATENTED JULY 28, 1908.
L. DE FOREST.
ELECTRODE FOR ELECTROLYTIC OR LIQUID OSCILLATION DETECTORS
FOR WIRELESS TELEGRAPHY.
APPLICATION FILED DEC. 21, 1905.
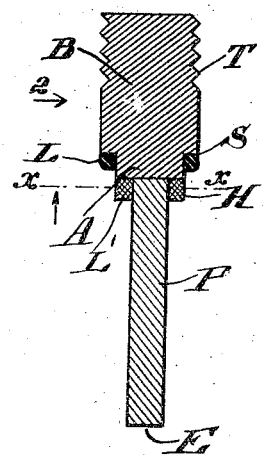
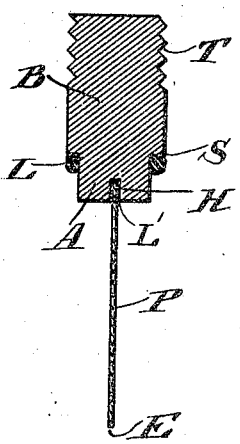
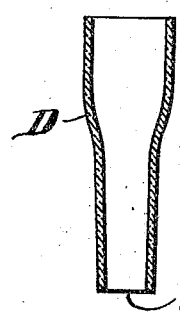
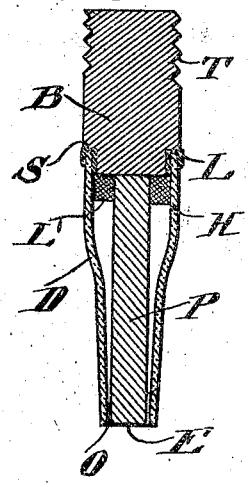
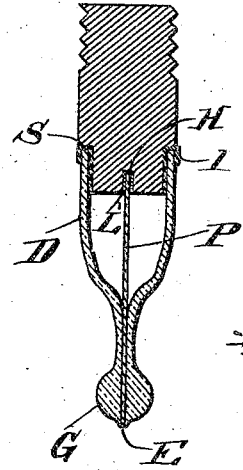
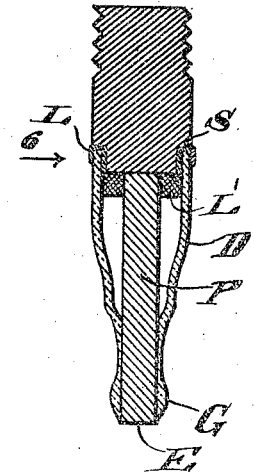
Attest:
C. G. Mitchell
M. W. McRae
Inventor:
Lee de Forest
by Philip Farnsworth Atty.

UNITED STATES PATENT OFFICE.

LEE DE FOREST, OF NEW YORK, N. Y., ASSIGNOR TO DE FOREST RADIO TELEPHONE CO., A CORPORATION OF NEW YORK.

ELECTRODE FOR ELECTROLYTIC OR LIQUID OSCILLATION-DETECTORS FOR WIRELESS TELEGRAPHY.

No. 894,317.      Specification of Letters Patent.      Patented July 28, 1908.

Application filed December 21, 1905. Serial No. 292,631.

*To all whom it may concern:*

Be it known that I, LEE DE FOREST, a citizen of the United States of America, and a resident of the city, county, and State of New York, have invented certain new and useful Improvements in Electrodes for Electrolytic or Liquid Oscillation-Detectors for Wireless Telegraphy, the principles of which are set forth in the following specification and accompanying drawings, which disclose the form of the invention which I now consider to be the best of the various forms in which those principles may be embodied.

This invention relates to improvements in electrodes for electrolytic or liquid oscillation detectors for wireless telegraphy or other feeble electrical impulses.

The invention consists in certain improvements hereinafter specified, upon the thin edge form of electrode of prior patent No. 716,203 to myself and E. H. Smythe. One of the various specific electrodes of this thin edge form, which was used by me prior to the filing of the application for said patent, consisted of a long narrow plate of thin metal foil held between two glass plates, so that only the edge of the end or narrow width of the thin metal plate was exposed from the glass plates, that edge being flush with the edges of the plates, so as not to expose too much of the area of the foil to the liquid, and to restrict such area. In this electrode the two glass plates were secured together by a cement such as shellac or glue, so that all interstices were attempted to be so filled up that the liquid electrolyte would not act upon any part of the metal plate except the exposed thin edge flush with the edges of the glass plates. This electrode was assembled in the following way. One surface of each glass plate was covered with a coat of glue or shellac, and then those surfaces were brought together on opposite sides of the thin metal plate or foil, the latter having a considerably less width than the glass plates, so that there was a considerable width of shellacked surfaces on each side of the longitudinal edges of the metal plate. This shellac, or insulation other than the glass, was thus not only located between the flat surfaces of the thin metallic plate and the glass plates, but also directly between the longitudinal edges of the metal plate and the liquid electrolyte. This electrode, together with the other electrode, which had considerable area exposed to the liquid, was immersed in a suitable electrolyte, contained in a vessel. Glass was used as the material for the covering plates, because it is a substance not readily attacked by any chemical solution used as the liquid electrolyte. While this device operated satisfactorily, it was not permanently durable because the liquid electrolyte tended to act through the cement upon other parts of the metal plate than the thin exposed edge thereof, and thus was exposed a greater area of the conductor to the action of the electrolyte. Furthermore, the ends of the glass plates adjacent the exposed thin edge of the metal plate, had so great a square surface as compared with the exposed thin edge of the metal plate itself, that gas bubbles were liable to become and remain attached to these flat ends of the glass plates, which bubbles were liable to engage the thin exposed edge of the metal plate itself and interfere with the effective action of the electrode. In general however, the thin edge metal plate form of the insulated small-exposed-area electrode type, possesses so many advantages over other forms of insulated small-exposed-area electrodes, and over non-insulated electrodes such as the extremely-fine uninsulated wire type, that it was extremely desirable to improve the thin edge form so that it might be very durable, in addition to being efficient in operation, and this is the object of the present invention.

The principal difficulty has been to so carefully insulate all parts of the conducting plate except its thin edge, that the liquid electrolyte cannot act upon any other parts of the plate than that edge. If some means could be found of so covering the conductor plate with glass, without the necessity of cementing together on opposite sides of the conducting plate, two separate plates of glass, then there would be no opportunity for the liquid electrolyte to have any deleterious action on a too great area of the conducting plate.

For some time past I have had considerable experience with the problem of covering cylindrical wires with glass insulation. In such work it was not believed possible to entirely cover a flat metal plate with glass, except as to its thin edge. An efficiently operating device was produced by cutting or shearing off the end of the cylindrical wire to obtain a V-shaped end which might be thin at its extreme edge, but this device did not possess all the advantages of the thin flat plate form.

In the work of covering cylindrical wires with glass so that the lateral surface of the end of the wire is covered with glass, leaving only the end surface of the wire exposed, there have been discovered certain matters which I came to believe might be useful in connection with a solution of the old problem, as in my prior double-plate device, of covering with insulation a flat foil conducting plate. The matter was investigated, and it was demonstrated that my belief was correct. The device of this disclosure is the result of that investigation.

As stated above, I had found that glass was an available material for use as the insulating covering, because it is not readily attacked by any of the chemical solutions used as the liquid electrolyte. I have endeavored to obtain a metal for the flat conducting plate, such that the latter might be sealed directly to the glass, in order to obviate the necessity for the presence of foreign insulating cement in addition to the glass, between the liquid and parts of the flat plate other than its thin exposed edge. The art of glass working teaches that the metals best adapted for sealing with glass are those which have substantially the same coefficient of expansion as glass, such as platinum or tantalum. In connection with my investigations connected with the work of covering cylindrical wires with glass, it was found that platinum could be used with success for the purpose of sealing the glass and wire together to properly insulate the latter, provided that the platinum was used in a form having sufficiently large cross-sectional dimensions.

In pursuance of the art of metal-working, I have obtained the metal platinum in the form of a flat foil plate, and have found that this provides a suitable thin edge for use in the insulation-covered type of electrode for oscillation detectors, when combined with an insulating covering in pursuance of the present invention, as hereinafter specified. I have found that platinum is, of all metals which may be sealed with glass, especially desirable for use as the flat foil plate or ribbon conductor, because its fusing point is so high that it does not change its shape when subjected to the high temperature required to effect the seal with glass, whereas other metals otherwise suitable, such as tantalum, might have so low a fusing point that when used in the form of a flat foil sheet or ribbon, for sealing with glass, they might be fused into undesirable shapes when attempted to be sealed with the glass. I do not however, wish to be limited to the use of platinum, because other conductors, (metals or otherwise), might be selected which would give equally good results, either with glass or with other suitable insulants.

Of the drawings, Figure 1 is a longitudinal section of the flat plate electrode and its chuck, before the plate is covered with insulation to constitute an electrode of the insulation covered type of the prior art; Fig. 2 is a similar section from a view-point ninety degrees from that of Fig. 1, as indicated at 2 in Fig. 1; Fig. 3 is a longitudinal section of a glass covering for the flat foil plate; Fig. 4 shows in longitudinal section, an incomplete assembly of the glass covering of Fig. 3, with the parts of Figs. 1 and 2; Fig. 5 is a similar view of the parts of Fig. 4, showing the complete assembly, after the glass sealing operation; Fig. 6 is a view of the device shown in Fig. 5, from a view-point ninety degrees from that of Fig. 5; Fig. 7 is a plan of the bottom of the insulation-covered electrode of Figs. 5 and 6, looking upwards; and Fig. 8 is a transverse section through the device of Fig. 1 along the line X—X.

As a result of my study of this problem, I have been able to obtain a device which operates fully as efficiently as my double plate device of the prior art above referred to, and which possesses the additional quality of being permanently durable. It perfectly fulfils the functions of the prior device, and at the same time is very much more durable as to its continuing effective operation.

In Fig. 1, B is a small chuck of conducting metal such as brass, provided with screw-threads or other suitable means T, for adapting it to be secured in good conducting relation with the electric circuit, and supported in the usual vessel containing the liquid electrolyte of the detector. This chuck B is provided with a projecting part A of smaller diameter and forming the shoulder S, and this part A is provided with a transverse slot H, all as shown in Figs. 1, 2 and 8. Around the part A, under the shoulder S, some sealing wax L is placed for a purpose to be described hereinafter. P is the thin flat narrow conducting plate or ribbon of a conductor such as the metal platinum, for the reasons given above. This plate P has its upper end inserted in the slot H, wherein it may be secured, as by the solder L'. E is the thin edge of the end of the plate, and in pursuance of the invention, the construction is to be such that only this edge E is to be exposed to the liquid electrolyte, as was the case with my prior double-plate device described above. The plate P is continuous, from its upper end which is secured in the chuck B, to its lower edge E which is to be left exposed. By thus making the plate continuous, there is obviated the joint between two parts extending below the chuck B, and the consequent desirability in the latter case, of having a longitudinal perforation entirely through the chuck to permit the tautening up of the two parts to prevent undue strains upon their point of juncture. The plate B may be about an inch long, about a thirty-second of an inch wide or wider, and in pursuance of the metal-working art, is rolled and hammered out to form a plate of metal foil, as in the case of my prior double-plate device described above. Such foil is common and well known in the art. These dimensions may vary, because the thinner the foil is prepared by the metal worker, the greater may be the width of the plate, in pursuance of the prior art of the insulation-covered type of restricted-areaed electrodes for wireless telegraphy detectors, as disclosed in the prior patent above referred to.

In Fig. 3 is shown the generally cylindrical insulation covering or duct D of glass for the plate P. This covering is circumferentially continuous, and constitutes the improved substitute in connection with the flat plate form of the insulation covered type of electrode, for the two flat plates of glass heretofore used by me. The duct D may be formed by drawing out as quickly as possible, a glass tube which is kept as hot as possible in a glass-blower's flame. This results in the form shown, wherein below the upper straight part of the duct D there is first an abrupt taper, which extends into a gradual taper. The tube from which the duct is drawn is cut or broken off to form the duct D with the small opening O at its lower end, the walls of the duct being very thin at the opening O as a result of the drawing out. The duct D may be made in other ways, provided that the wall at O is quite thin (say about one one-hundredth of an inch), as compared with the original wall thickness, as at the upper part of the duct. In the drawings, it is not attempted to show the duct to scale, but however the duct may be made, its wall around the opening O should be quite thin, although thinness may be obtained to a large degree by the further action upon the device hereinafter to be described. Generally, the outside diametrical dimensions of the lower end of the duct at O, will be about a thirty-second of an inch, or a little greater than the width of the flat plate P.

Fig. 4 shows the part D attached to the chuck B, by being sealed thereto under the shoulder S, as by the sealing wax L. The part D may be a little longer than the flat plate P, and just so much longer that by adjustment in the soft sealing wax L during the sealing operation, it may be fixed so that the lower end of the part D is flush with the edge E of the lower end of the plate P.

In Figs. 5 and 6 are shown the parts after the plate P and part D have been sealed together at their lower ends. Owing to the fact that the platinum of which the flat ribbon of foil P is composed, has a very high fusing point, that part keeps its shape during and after the glass sealing operation; although it would shrivel up and its thin edge E be destroyed if a metal were used which had a low fusing point. There is apparently no observable difference in the shape of the plate P after the sealing operation. But the glass duct D thereby undergoes, as a result of the sealing, a curious change of shape from its cylindrical form of circular cross-section, although, the thing once accomplished, the change seems to be logical. Not only do the walls of the duct become thinner to form the globule G, both above and below that globule, but the outer configuration of the duct above the globule, as well as its interior configuration above the globule, conforms to the rectangular shape of the plate P. The interior lines of the cross-section of the glass duct correspond with and conform to the flat shape of the conductor. Furthermore, as a general rule, the wall of the glass part D above the globule G is thinner along the longitudinal edges of the plate P than it is along the longitudinal flat surfaces of the plate; and also at the globule portion, there is less thickness of glass over the longitudinal edges of the plate than there is over the flat surfaces of the plate. The configuration is not always symmetrical, as departures are sometimes caused by varying conditions of manufacture. The general result was surprising, as it was not believed until after extensive experimentation, that a flat plate could be properly covered by sealing to it a cylindrical glass duct, so as to leave only the thin end and no other portions of the flat plate exposed. Apparently no matter how thin the resulting drawn-down wall of glass above the globule G along the longitudinal edges of the plate P, as shown in Fig. 5, it seems always to be continuous and unbroken so that the liquid electrolyte cannot obtain access to the parts of the plate within the duct. And although the opening O and the outside diameter of the part D thereat, are only slightly greater in diameter than the width of the edge E of the plate P, nevertheless there seems to be always sufficient glass above and below the globule G to completely cover the lower part of the plate P except the edge E, no parts of the longitudinal edges of the plate near its end being exposed from the glass; although the entire edge E is exposed. But the wall of the part D below the globule is so thin, owing to the fact that a large portion of the glass is drawn upwardly to form the globule, that no gas bubbles can remain on the end of the glass, as they did in my old double-glass-plate form, to injuriously affect the efficiency of the device. The glass covering does however, extend entirely down to the edge E, although it becomes thinner and thinner toward that edge, and finally stops short at that edge so as to leave the entire edge exposed. The result is that a thin edge is presented to the liquid, such edge consisting chiefly of the conducting plate, with the slight additional thickness of the extremely thin wall of the glass duct at the edge of the plate. This provides a structure which is certain to shed all bubbles of gas. In case the glass covering does not extend entirely down to the edge E, owing to accidental causes in manufacture, so as not to cover up all the plate P except the edge and protect the plate from the liquid electrolyte, the electrode must be thrown away after manufacture, as it will be inoperative. The plate P is so wide (a thirty-second of an inch or more), and therefore has so much surface area for an extremely short length, that if any part of it projected out beyond the glass, so that when supported in the usual vessel, it would project even very slightly into the liquid, the device would be inoperative, and would not be included in the class of insulation-covered restricted-areaed electrodes of the prior art.

I have found it to be a fact that an electrode for oscillation detectors of the non-insulated type which is so extremely fine or which has such extremely small cross-sectional dimensions, that it will be operative when it projects even the slightest distance into the liquid, cannot be sealed with glass, because owing to its extreme fineness it would be fused and destroyed by the heat required for such sealing. In order to be successfully sealed with glass without fusion and destruction, to produce an electrode of the insulation-covered type, the conductor must have such large cross-sectional dimensions that it would be inoperative if the slightest portion of its length projected into the liquid so that it might have any length or extent of immersion other than that of its thin edge area. Therefore, in pursuance of this invention, the cross-sectional dimensions of the flat plate are necessarily so large, in order to be successfully sealed with the glass, that the device will be inoperative unless the exposed area is restricted, by the insulation covering, to the thin edge of the plate, without any immersion of any part of the length of the plate, the broad surfaces of which would, if exposed to the liquid, cause the device to be inoperative.

The sealing together of the glass part D and the plate P is best accomplished by successive short applications in a glass blower's flame, end on, of the flush ends of said parts. These successive applications should be continued until the device by actual test, is shown to be operative. This electrode is adapted for use as the anode of the detector, as known to those skilled in the art.

In view of the above description, it is clear that my improved electrode obviates the defects as to lack of permanent durability, of my prior device having the thin metal plate covered with two separate flat plates of glass cemented together. The liquid electrolyte cannot penetrate the glass which entirely covers up the lower part of the plate P, and the sealing wax L prevents access to the plate of any liquid which might creep up the sides of the part D. As a matter of fact there is very little chance of liquid creeping up so far as that, but in order to be certain that no liquid electrolyte may reach the chuck B, the duct D is usually supported in the vessel so that the level of the liquid is far below the seal L. Other than this consideration there is no limit to the length of the glass part D which may extend into the vessel, since the exposed edge E of the plate P requires no adjustment, as in the case with the extremely fine uninsulated type of electrode, but has its entire area constantly exposed to the liquid. The duct D is laterally continuous, as distinguished from my double-plate form, and so the duct itself entirely surrounds the surfaces and edges of the plate P.

I claim:

1. An electrode of the insulation-covered type, for a detector of wireless telegraphy oscillations or other feeble electrical impulses, which comprises a thin flat plate conductor; a metallic chuck of two diameters forming a shoulder between the portions of different diameters, to which chuck said flat plate conductor is retained in good electrical contact therewith; a glass duct open at both ends and laterally continuous so that the duct itself entirely surrounds the longitudinal surfaces and edges of said conductor, said duct being attached at one end to the shouldered portion of said chuck, the other end of said duct being flush with the end of said conductor, and said duct having a thin wall at and near the flush end of the conductor; said thin plate conductor, in ribbon-like form, having a suitable coefficient of expansion and sufficiently large cross-sectional dimensions for sealing with glass, and being sealed with the thin wall of the glass duct at their adjacent lateral surfaces next their flush ends, directly and without any intervening foreign substance, so that only the thin edge of the end of the conducting plate is exposed from the flush end of the glass duct and so that the interior line of the cross-section of the glass duct corresponds with the flat shape of the conductor; said flat plate conductor having a high fusing point so that it will retain its ribbon-like shape under the high temperature necessary for sealing with glass.

2. An electrode of the insulation-covered type, for a detector of wireless telegraphy oscillations or other feeble electrical impulses, which comprises a laterally continuous glass duct, and a flat foil plate of conducting material which has a suitable coefficient of expansion and sufficiently large cross-sectional dimensions for sealing with glass, and which is laterally entirely surrounded by the glass duct so that the duct itself entirely surrounds the flat surfaces and longitudinal adjacent edges of the plate; the adjacent ends of the duct and plate being flush with each other, the glass duct having a thin wall at and near the flush end of the conducting plate, and said glass duct having its thin wall sealed with the conducting plate at their adjacent lateral surfaces and edges next their flush ends, directly and without any intervening foreign substance, so that only the thin edge of the end of the plate is exposed from the flush end of the glass duct; the conductor of which said plate is composed having a high fusing point so that it will retain its shape as a plate under the high temperature required for sealing with the glass duct.

3. An electrode of the insulation-covered type, for a detector of wireless telegraphy oscillations or other feeble electrical impulses, which comprises a thin flat plate of conducting material which has a suitable coefficient of expansion and sufficiently large cross-sectional dimensions for sealing with glass, and which has a greater length than width, being in the form of a ribbon; a laterally continuous glass duct extending laterally entirely around said plate; the end of the duct being flush with the end of the plate, and said glass duct having a thin wall at and near the flush end of the conducting plate, and said duct near its flush end having its thin wall sealed to both flat surfaces and both longitudinal edges of the plate, next the flush end of the plate, directly and without any foreign substance between the duct and plate, so that only the thin edge of the end of the plate is exposed from the flush end of the duct; the conductor of which said plate is composed having a high fusing point so that it will retain its shape under the high temperature required for sealing with the glass duct.

4. An electrode of the insulation-covered type, for a detector of wireless telegraphy oscillations or other feeble electrical impulses, which comprises a thin flat plate of conducting material which has a suitable coefficient of expansion and sufficiently large cross-sectional dimensions for sealing with glass, and which has a greater length than width, being in the form of a ribbon; a laterally continuous glass duct extending laterally entirely around said plate, the end of the duct being flush with the end of the plate, and said duct near its flush end being sealed to both flat surfaces and both longitudinal edges of the plate, next the flush end of the plate, directly and without any foreign substance intervening between the duct and plate, so that only the thin edge of the end of the plate is exposed from the flush end of the duct; the conductor of which said plate is composed having a high fusing point so that it will retain its shape under the high temperature required for sealing with the glass duct; the configuration of the glass duct where it is sealed to the plate, partaking of the configuration of the plate, but the wall of the duct being thinner over the longitudinal edges of the plate than over the flat surfaces of the plate.

5. An electrode of the insulation-covered type, for a detector of wireless telegraphy oscillations or other feeble electrical impulses, which comprises a thin flat conducting plate, and a laterally continuous duct of insulating material extending laterally entirely around said plate so that the duct itself entirely surrounds the lateral flat surfaces and the longitudinal edges of the plate, the end of the duct being flush with the end of the plate, and the duct and plate being sealed with each other at their adjacent lateral surfaces next their flush ends, directly and without any intervening foreign substance, so that only the thin edge of the end of the plate is exposed from the flush end of the duct.

6. An electrode of the insulation-covered type, for a detector of wireless telegraphy oscillations or other feeble electrical impulses, which comprises an electrode conductor; a metallic chuck of two diameters forming a shoulder between the portions of different diameter, to the smaller portion of which chuck said electrode conductor is secured in good electrical relation therewith; and a glass duct having a large and a small opening at the respective ends, the wall of the larger opening being attached to the shouldered portion of said chuck, and the wall of the smaller opening being sealed with the lateral surface of the end of the conductor.

LEE DE FOREST.

Witnesses:
M. M. MACRAE,
LESTER TESTUT.